(12) United States Patent
Vu

(10) Patent No.: US 6,769,463 B2
(45) Date of Patent: Aug. 3, 2004

(54) FLUID FLOW SYSTEM

(75) Inventor: Kim Ngoc Vu, Yorba Linda, CA (US)

(73) Assignee: Celerity Group, Inc., Santa Clara, CA (US)

( * ) Notice: Subject to any disclaimer, the term of this patent is extended or adjusted under 35 U.S.C. 154(b) by 40 days.

(21) Appl. No.: 10/147,427

(22) Filed: May 16, 2002

(65) Prior Publication Data

US 2002/0195165 A1 Dec. 26, 2002

Related U.S. Application Data

(60) Provisional application No. 60/291,430, filed on May 16, 2001.

(51) Int. Cl.[7] ................................................. G05D 7/00
(52) U.S. Cl. ......................... 141/98; 137/486; 137/884
(58) Field of Search ........................... 141/98; 137/486, 137/884

(56) References Cited

U.S. PATENT DOCUMENTS

| | | |
|---|---|---|
| 3,234,964 A | 2/1966 | Tinsley et al. |
| 3,934,605 A | 1/1976 | Legris |
| 4,378,027 A | 3/1983 | Weirich et al. |
| 5,048,569 A | 9/1991 | Stoll et al. |
| 5,368,062 A | 11/1994 | Okumura et al. |
| 5,605,179 A | 2/1997 | Strong, Jr. et al. |
| 5,662,143 A | 9/1997 | Caughran |
| 5,730,181 A | 3/1998 | Doyle et al. |
| 5,819,782 A | 10/1998 | Itafuji |
| 5,836,355 A | 11/1998 | Markulec et al. |
| 5,860,676 A | 1/1999 | Brzezicki et al. |
| 5,983,933 A | 11/1999 | Ohmi et al. |
| 5,992,463 A | 11/1999 | Redemann et al. |
| 6,068,016 A | 5/2000 | Manofsky, Jr. et al. |
| 6,142,539 A | 11/2000 | Redemann et al. |
| 6,189,570 B1 | 2/2001 | Redemann et al. |
| 6,192,938 B1 | 2/2001 | Redemann et al. |
| 6,231,260 B1 | 5/2001 | Markulec et al. |
| 6,293,310 B1 | 9/2001 | Redemann et al. |
| 6,422,256 B1 * | 7/2002 | Balazy et al. .................. 137/12 |
| 6,615,870 B2 | 9/2003 | Tsourides |
| 2003/0106597 A1 | 6/2003 | Ichikawa et al. |

FOREIGN PATENT DOCUMENTS

| | | |
|---|---|---|
| DE | 25 47 847 A1 | 5/1977 |
| DE | 94 11 684 | 9/1994 |
| EP | 0 392 072 A1 | 10/1990 |
| EP | 0 592 066 A1 | 4/1994 |
| EP | 0 754 896 A2 | 1/1997 |
| EP | 0 845 623 A1 | 6/1998 |
| EP | 0 918 179 A2 | 5/1999 |
| EP | 0 969 234 A1 | 1/2000 |
| JP | 8-312900 | 11/1996 |
| WO | WO 96/34705 A1 | 11/1996 |
| WO | WO 99/22165 A1 | 5/1999 |

* cited by examiner

Primary Examiner—J. Casimer Jacyna
(74) Attorney, Agent, or Firm—Lowrie, Lando & Anastasi, LLP

(57) ABSTRACT

The present application relates to fluid flow systems and more particularly to fluid flow systems for use in the semiconductor industry. In one embodiment, the present invention is directed to a fluid stick adapted to be mounted to a mounting surface. The fluid stick includes a first flow component positioned in the fluid stick and a second flow component positioned in the fluid stick between the first flow component and the mounting surface and in fluid connection with the first flow component.

21 Claims, 8 Drawing Sheets

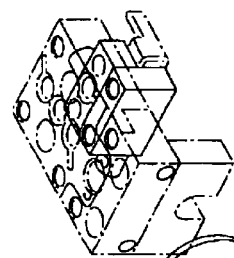
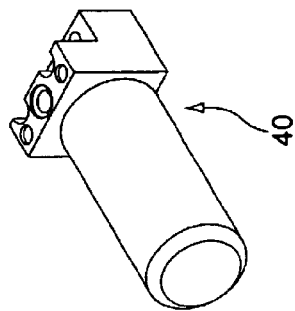
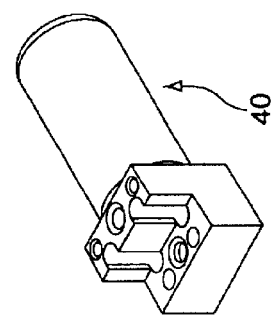
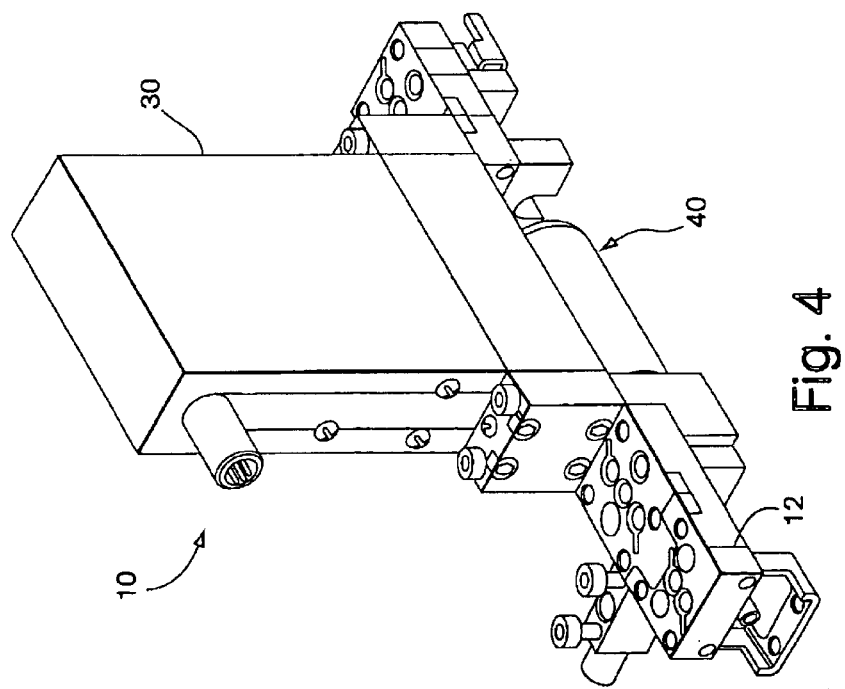

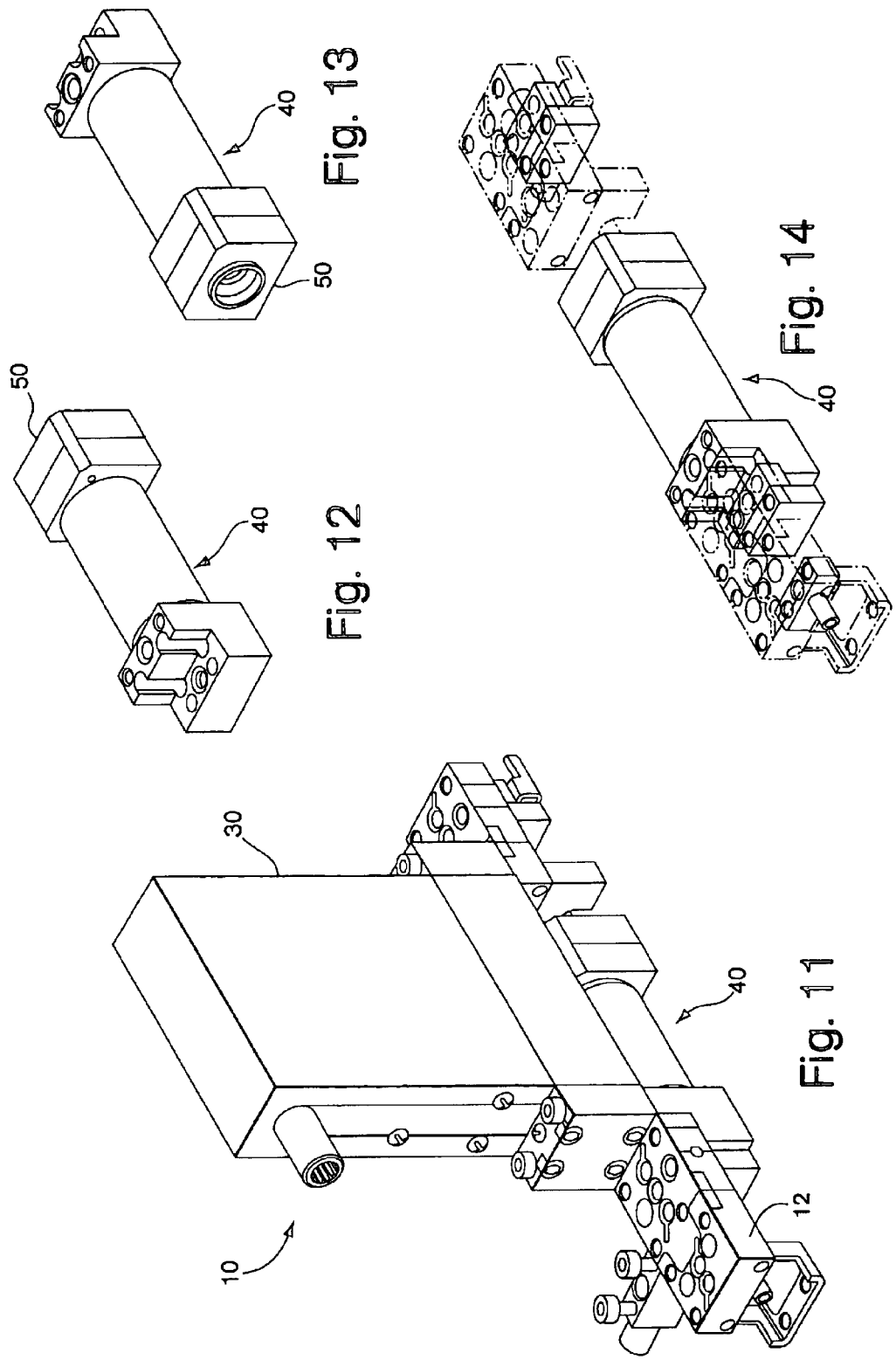

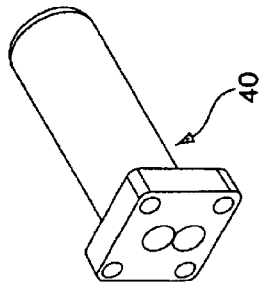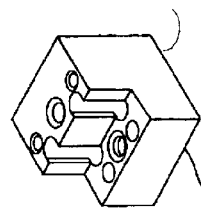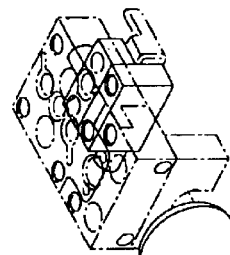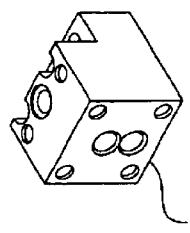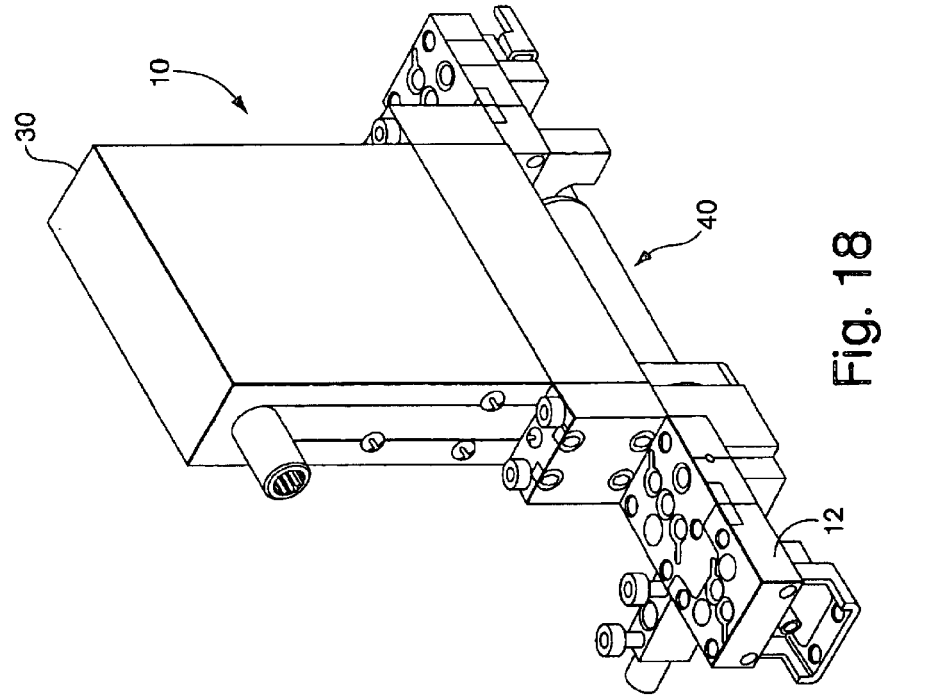

FLUID FLOW SYSTEM

This application claims priority under 35 U.S.C. §119(e) to U.S. provisional patent application serial No. 60/291,430, entitled "Fluid Flow System," filed May 16, 2001, which is incorporated herein by reference in its entirety.

BACKGROUND

1. Field of the Invention

The present application relates to fluid flow systems and more particularly to fluid sticks for use in the semiconductor industry.

2. Description of the Related Art

Sophisticated fluid flow systems are required to supply fluid to sensitive processes, such as many semiconductor processes. Such processes are typically sensitive to contamination and fluid dosage and may require that very small amounts of fluid are accurately metered. Due to the problems associated with contamination of such processes, fluid flow systems in semiconductor processes are typically housed in clean rooms. As a result, space is at a premium and there has been an effort to reduce the size of such fluid flow systems. Furthermore, the gases required in semiconductor processes, such as those used in silicon chip fabrication, are often highly corrosive, necessitating careful control and monitoring.

Systems for supplying process fluid to semiconductor processes typically include one or more connections of flow components, such as mass flow controllers, filters, pressure transducers, valves and the like. Such systems are typically arranged with individual flow components being fluidly connected to one another in a series. Such flow components in series are typically mounted to a common surface in a linear arrangement or row of flow components, and the row of flow components is commonly referred to as a "gas stick." However, it should be appreciated that many gas sticks handle fluids other than gases, such as liquids, and that phase changes may occur within the gas stick.

At one time flow components were fluidly connected using tubing and couplings. However, because of the generally inflexible nature of the tubing required to handle the fluids, to remove one flow component, other flow components also had to be disrupted. One attempt to solve this problem is to include flow paths within a body of a support piece to which flow components are mounted, allowing each flow component to be simply bolted and unbolted from the support piece to place them in fluid connection with other flow components. Such a fluid system is described in U.S. Pat. No. 5,992,463, which is herein incorporated by reference in its entirety. Modular fluid flow systems have also been introduced, in which a series of interlocking pieces having flow paths therein form the support structure for the flow components, allowing greater flexibility in the mounting surface. An example of a modular fluid flow system is described in U.S. application Ser. No. 09/229,722, filed Jan. 13, 1999, entitled Manifold System of Removable Components for Distribution of Fluids, which is herein incorporated by reference in its entirety. Like previous systems, modular fluid flow systems are generally arranged linearly in a single plane.

SUMMARY

According to one aspect of the present invention, a fluid flow system is provided in which multiple fluid flow components may share a common footprint.

In one embodiment, the present invention is directed to a fluid stick adapted to be mounted to a mounting surface. The fluid stick includes a first flow component positioned in the fluid stick and a second flow component positioned in the fluid stick between the first flow component and the mounting surface and in fluid connection with the first flow component.

In another embodiment, the present invention is directed to a fluid stick adapted to be mounted to a mounting surface. The fluid stick includes a mass flow controller positioned in the fluid stick and a fluid filter positioned in the fluid stick between the mass flow controller and the mounting surface and in fluid connection with the mass flow controller.

In another embodiment, the present invention is directed to a fluid stick including an inlet, an outlet, and a plurality of flow components generally arranged along a first axis between the inlet and the outlet and fluidly connected in series. A first and a second flow component of the plurality of flow components are arranged along a second axis generally transverse to the first axis.

BRIEF DESCRIPTION OF THE DRAWINGS

FIG. 4 is a perspective, plan view of the embodiment of FIG. 1;

FIG. 5 is a perspective, plan view of one aspect of the embodiment of FIG. 1;

FIG. 6 is a perspective, plan view of one aspect of the embodiment of FIG. 1;

FIG. 7 is a perspective, plan view of one aspect of the embodiment of FIG. 1;

FIG. 11 is a perspective, plan view of the embodiment of FIG. 8;

FIG. 12 is a perspective, plan view of one aspect of the embodiment of FIG. 8;

FIG. 13 is a perspective, plan view of one aspect of the embodiment of FIG. 8;

FIG. 14 is a perspective, plan view of one aspect of the embodiment of FIG. 8;

FIG. 18 is a perspective, plan view of the embodiment of FIG. 15;

FIG. 19 is a perspective, plan view of one aspect of the embodiment of FIG. 15;

FIG. 20 is a perspective, plan view of one aspect of the embodiment of FIG. 15;

FIG. 21 is a perspective, plan view of one aspect of the embodiment of FIG. 15;

FIG. 22 is a perspective, plan view of one aspect of the embodiment of FIG. 15;

DETAILED DESCRIPTION

Figure 1:
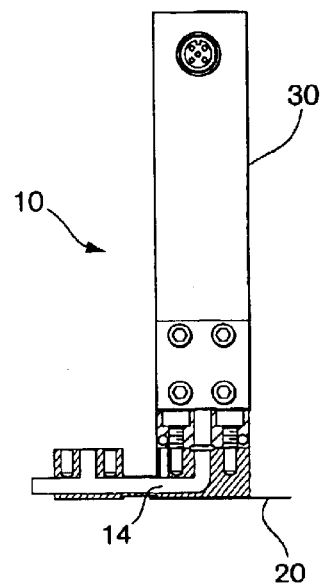
FIG. 1 is an end, cross-sectional view of one embodiment of the invention along line A—A of FIG. 3.
Figure 2:
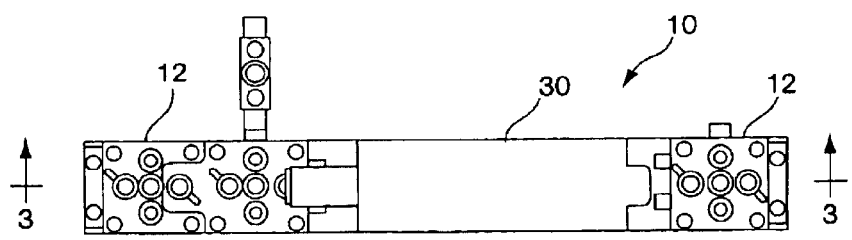
FIG. 2 is a top, plan view of the embodiment of FIG. 1.
Figure 3:
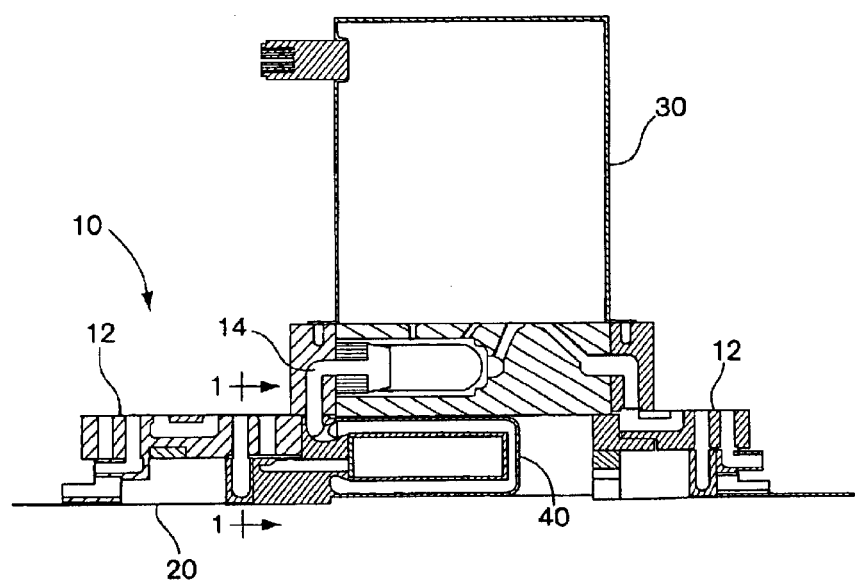
FIG. 3 is a side, cross-sectional view of the embodiment of FIG. 1 along line B—B of FIG. 2.
Figure 8:
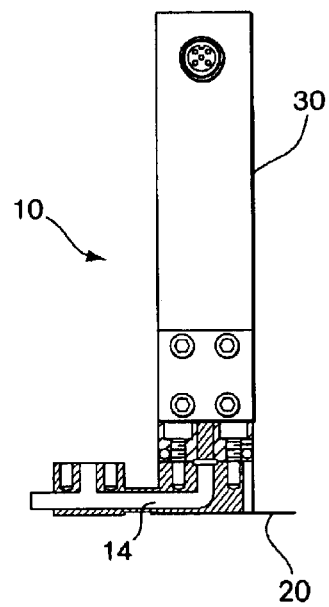
FIG. 8 is an end, cross-sectional view of another embodiment of the invention along line A—A of FIG. 10.
Figure 9:
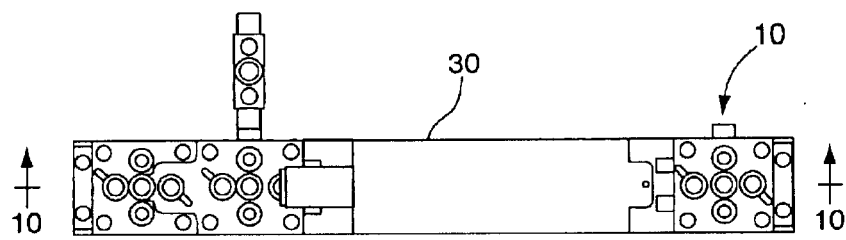
FIG. 9 is a top, plan view of the embodiment of FIG. 8.

In one embodiment, the present invention is directed to a fluid stick adapted to be mounted to a mounting surface. The fluid stick includes a first flow component positioned in the fluid stick and a second flow component positioned in the fluid stick between the first flow component and the mounting surface and in fluid connection with the first flow component. As used herein, the term "fluid stick" refers to any combination of at least three flow components generally arranged along a common axis and in serial fluid connection with one another. For example, a fluid stick may be a standard gas stick. It is to be understood that the fluid need not identically flow along the common axis, so long as the flow of fluid from an input of the fluid stick to an output of the fluid stick is generally parallel to this axis. For example, fluid may flow "down" into flow paths in a base block and back "up" into a flow component, or may even flow in a direction opposite the overall direction of flow along the common axis within a portion of a flow component as it travels generally along the length of a fluid stick. As used herein, "flow component" refers to any device that affects or senses a property of a fluid within a fluid flow system. For example, a flow component may be a mass flow controller, a pressure transducer, a filter, a valve, a moisture sensor, a temperature sensor, or the like. By contrast, a portion of a fluid flow system that does not affect or sense a property of a fluid within the system and that solely acts as a conduit for fluid transfer is referred to herein as a "flow path."

Referring now to the figures, and in particular FIGS. 1–7, one embodiment of a fluid flow system according to the present invention will be described by way of example. In this example embodiment, a fluid flow system includes a portion of a fluid stick 10 disposed on a mounting surface 20, a first flow component 30 positioned in the portion of the fluid stick 10 and a second flow component 40 positioned between first flow component 30 and mounting surface 20.

Fluid stick 10 may be constructed in any manner and using any materials that allow it to control and/or monitor the flow of gas for a particular use. For example, fluid stick 10 may include any number of flow components 30, 40 having the ability to affect or sense any property of a fluid. Flow components 30, 40 may be interconnected in fluid stick 10 with flow paths 14. In one embodiment, fluid stick 10 is constructed of flow components and structures containing flow paths. Such a structure may be a single block having multiple flow paths to which a number of flow components may be mounted to fluidly inter-connect the flow components, or it may include multiple blocks 12, each including one or more fluid paths. Where fluid stick 10 includes multiple blocks 12 including flow paths, blocks 12 may include a variety of different blocks. For example, each block may be adapted to support a different flow component or type of flow component. Blocks may be connected to one another in various ways to form complex flow path containing structures. It will be appreciated by those of skill in the art that the exact manner and materials of construction of fluid stick 10 will depend upon the nature of the application for which it is to be used and may be selected based upon this application. For example, in high purity applications, materials such as stainless steel may be used.

Mounting surface 20 may be constructed in any manner and using any materials that allow the components of fluid stick 10 to be mounted thereon. For example, mounting surface 20 may be a relatively flat, sturdy surface upon which flow components 30, 40 and/or support structures containing flow paths 14, such as blocks 12, may be mounted. In semiconductor applications, mounting surface 20 may be a wall of a structure containing multiple fluid sticks, often referred to as a gas box.

Figure 10:
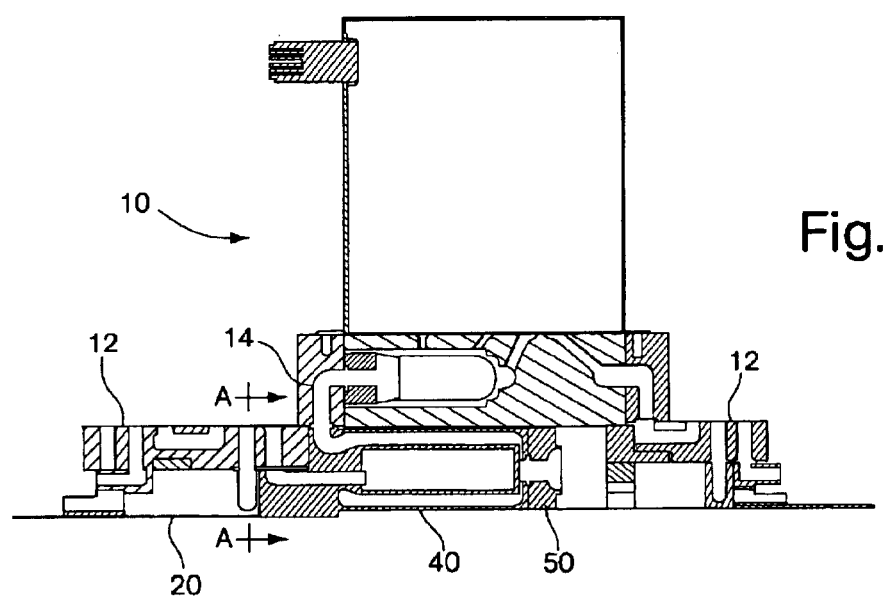
FIG. 10 is a side, cross-sectional view of the embodiment of FIG. 8 along line B—B of FIG. 9.
Figure 15:
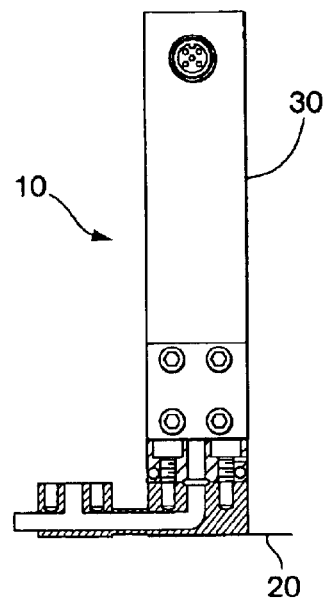
FIG. 15 is an end, cross-sectional view of another embodiment of the invention along line A—A of FIG. 17.
Figure 16:
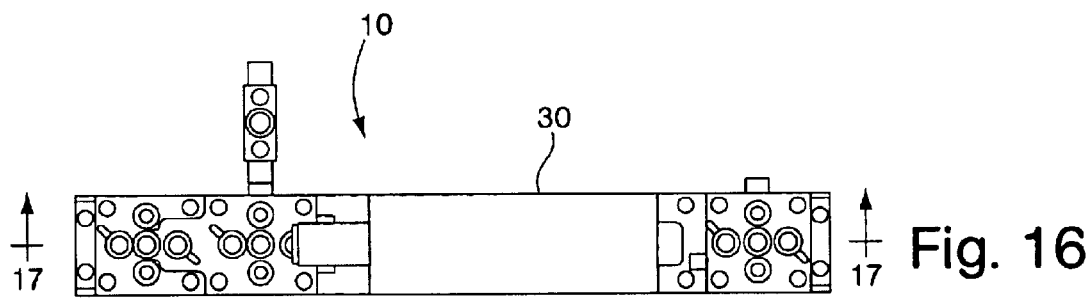
FIG. 16 is a top, plan view of the embodiment of FIG. 15.
Figure 17:
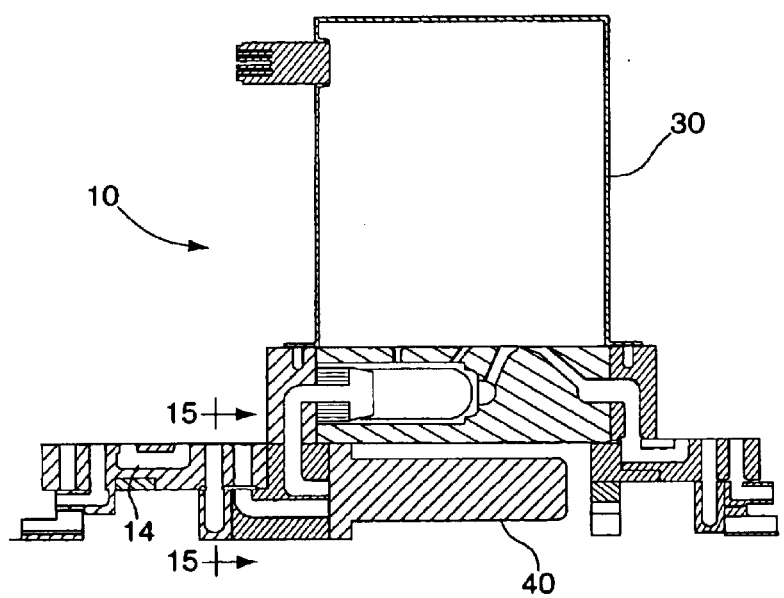
FIG. 17 is a side, cross-sectional view of the embodiment of FIG. 15 along line B—B of FIG. 16.
Figure 23:
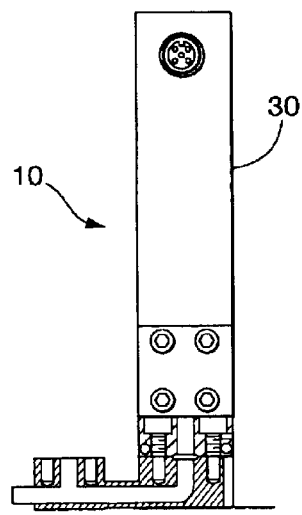
FIG. 23 is an end, cross-sectional view of a further embodiment of the invention along line A—A of FIG. 25.
Figure 24:
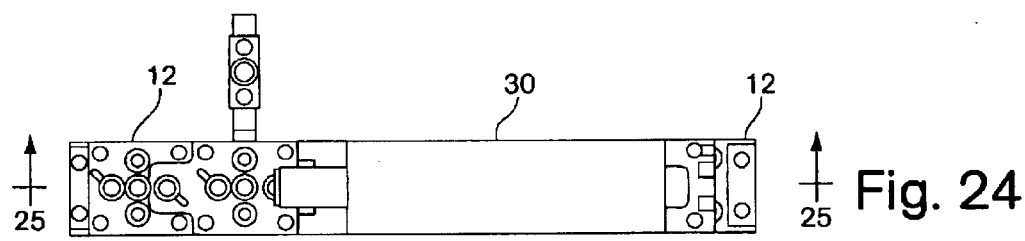
FIG. 24 is a top, plan view of the embodiment of FIG. 23.
Figure 25:
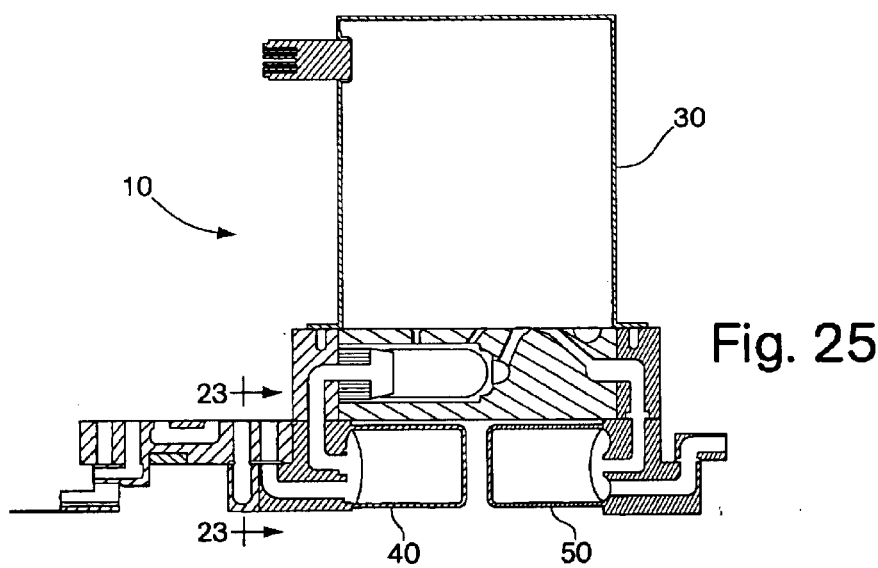
FIG. 25 is a side, cross-sectional view of the embodiment of FIG. 23 along line B—B of FIG. 24.
Figure 28:
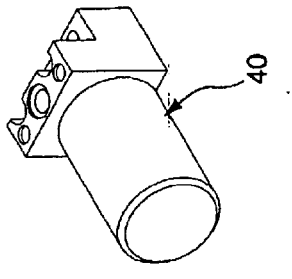
FIG. 28 is a perspective, plan view of one aspect of the embodiment of FIG. 23.
Figure 27:
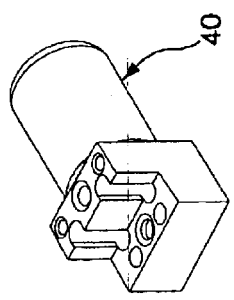
FIG. 27 is a perspective, plan view of one aspect of the embodiment of FIG. 23.
Figure 29:
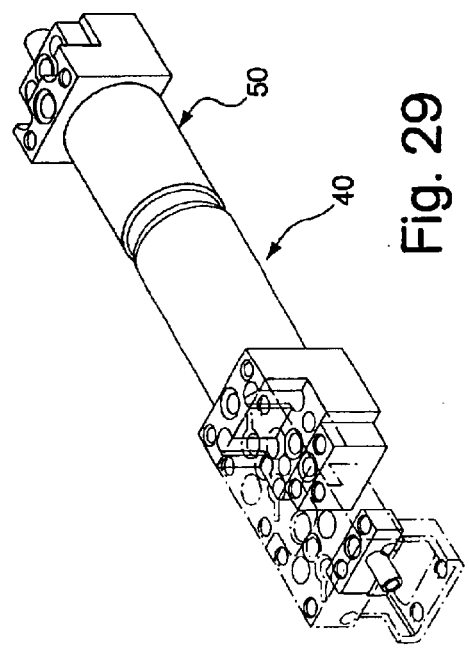
FIG. 29 is a perspective, plan view of one aspect of the embodiment of FIG. 23.
Figure 26:
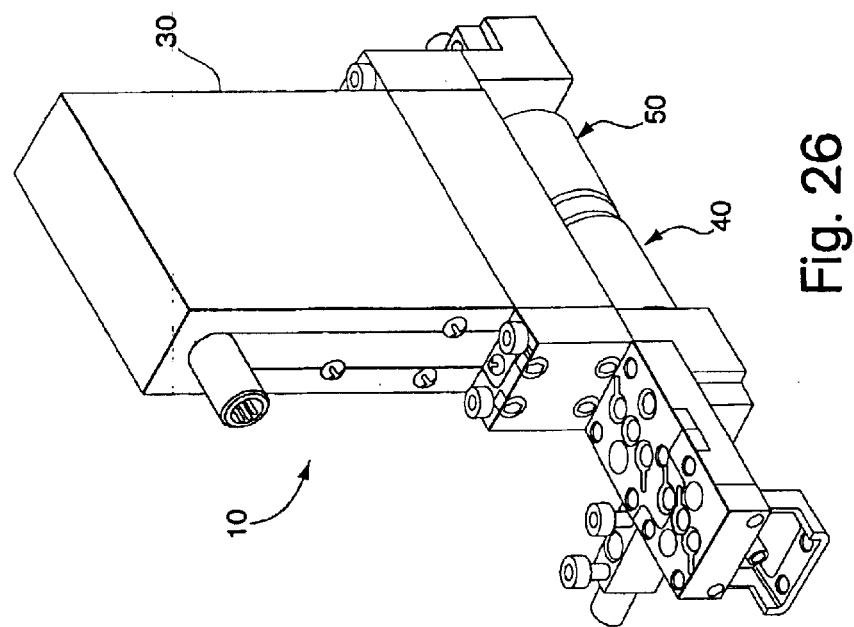
FIG. 26 is a perspective, plan view of the embodiment of FIG. 23.

Flow components 30, 40 may be any flow component that allows fluid stick 10 to perform as desired. For example, one or both of flow components 30, 40 may be mass flow controllers, pressure transducers, filters, valves, moisture sensors, temperature sensors, or the like. In the embodiment illustrated in FIGS. 1–7 first flow component 30 is a mass flow controller and second flow component 40 is a filter. In the embodiment illustrated in FIGS. 8–14 first flow component 30 is a mass flow controller, second flow component 40 is a filter and a third flow component 50 is a pressure transducer. The embodiment of FIGS. 8–14 illustrates that the flow components of the present invention may also be integrally constructed or positioned within one another to further reduce the footprint of the fluid stick. For example, as shown in FIG. 10, a pressure transducer (second flow component 50) may be integrally constructed with, and positioned within, a filter (third flow component 40). Other devices can be combined in this way, for example, a temperature sensor could be integrally constructed with a pressure transducer or positioned within a filter. It should be recognized that integrally constructed flow components, and components positioned within one another, may also find utility in embodiments where a second flow component is not positioned between a first flow component and a mounting surface. In the embodiment illustrated in FIGS. 23–29 first flow component 30 is a mass flow controller, second flow component 40 is a diaphragm valve and third fluid component 50 is a second diaphragm valve. Examples of mass flow controllers that may be suitable for use with the present invention may be found in U.S. Patent Application titled "System and Method for a Mass Flow Controller," by inventors John M. Lull, Chiun Wang, William S. Valentine and Joseph Saggio, filed Apr. 24, 2002 (Serial No. not yet assigned), which is herein incorporated by reference in its entirety.

According to one embodiment of the present invention, first flow component 30 is positioned in fluid stick 10. First flow component 30 may be positioned within fluid stick 10 in any manner that allows fluid stick 10 to perform as desired. For example, where it is desired to control a mass flow rate of fluid within fluid stick 10, first flow component 30 may be a mass flow controller fluidly connected to other flow components of fluid stick 10. First flow component 30 may also be the first or last flow component on fluid stick 10, such that it is fluidly connected to only one other flow component and to either a fluid source or a point of use of the fluid. In one embodiment, flow component 30 is mounted to one or more structures, such as blocks 12, which are, in turn, mounted to mounting surface 20. In another embodiment, one or both of the structures to which first flow component 30 is mounted are portions of second flow component 40.

According to one embodiment of the present invention, second flow component 40 is positioned between first flow component 30 and mounting surface 20. Second flow component 40 may be positioned between first flow component 30 and mounting surface 20 in any manner that allows fluid stick 10 to function as desired. For example, second flow component 40 may be coupled to either an inlet or an outlet of first flow component 30 and to another flow component. In some embodiments it may be possible to reverse the orientation of second flow component such that it may be connected to either the inlet or the outlet of the first flow component. For example, flow component 40 illustrated in FIG. 4 may be adapted to be fluidly coupled to an input of flow component 30, as shown in FIG. 5, or to an output of flow component 30. Second flow component 40 may be positioned such that it fills a space that otherwise would have gone unused. For example, second flow component 40 may be positioned in an empty space between first flow component 30 and mounting surface 20, such as may exist where first flow component 30 is supported only at its ends. As an alternate example, second flow component 40 may replace one or more structures, such as blocks 12, to which first flow component 30 is normally mounted. In this way, space that previously contained nothing, or only a flow path, may now also serve as a flow component.

In one embodiment, illustrated in FIGS. 15–22, a structure that supports first flow component 30 is designed to allow second flow component 40 to be mated thereto such that it is between first flow component 30 and mounting surface 20. For example, a block 12 supporting first flow component 30 may also include structure to support second flow component 40 below first flow component 30 and to fluidly connect the components. This embodiment has the advantage that block 12 may be designed such that conventional flow components, such as an off the shelf component, like a filter, may be easily positioned between first flow component 30 and mounting surface 20. It should also be appreciated that in this and other embodiments a "dummy component" including only a flow path may be provided where it is not desired to include a second flow component, but to preserve the option to have a second flow component in the future. In an alternate embodiment, illustrated, for example, in FIGS. 1–7, second flow component 40 may be integrally formed with a support structure for another fluid flow component, such as first flow component 30, such as a base block 12. Where second fluid flow component 40 is built into a support structure for another fluid flow component, it may be possible to create an overall smaller structure to perform both the support and flow component functions, resulting in space and cost savings. Furthermore, less components, such as seals, will be required due to the decrease in the number of couplings.

Where second fluid component 40 is built into a support structure, it may or may not be readily noticeable to someone viewing the fluid stick that second fluid component 40 is present. For example, second fluid component 40 may extend noticeably from the support structure and may be easily spotted during maintenance, and the like, or it may be hidden. If second component 40 is not easily noticeable, the support structure or other portion of the fluid stick may be labeled to bring second fluid component 40 to the attention of maintenance workers and others.

In one embodiment, second flow component 40 positioned between first flow component 30 and mounting surface 20 may be more reliable (e.g., may be less likely to need service or replacement) than first flow component 30. Preferably, the second component is also cheaper than the first component. For example, a flow component requiring less frequent service, such as in the order of years, may be positioned between a flow component requiring more frequent service, such as in the order of months, and a mounting surface. Examples of a flow component requiring less frequent service are a filter, a diaphragm valve and a pressure transducer, while an example of a flow component requiring more frequent service is a mass flow controller. Other combinations of flow components requiring more and less frequent service will be easily identified by those of skill in the art.

It will now be appreciated that the present application is able to shorten the length of a fluid stick by making use of any dead spaces that may exist above or below flow components in the fluid stick. Even where such dead spaces do not exist, the present application allows a fluid stick designer to trade space requirements along one axis for space requirements along another axis, typically transverse to the first axis. Various embodiments of the present application are particularly well suited to fluid flow applications where space is limited and costly and may provide significant cost savings in such applications. Even where such conditions do not exist, the present application provides greater flexibility than previously available in fluid stick applications.

What is claimed is:

1. A fluid stick adapted to be mounted to a mounting surface, the fluid stick comprising:
   a first flow component positioned in the fluid stick; and
   a second flow component positioned in the fluid stick between the first flow component and the mounting surface and in fluid connection with the first flow component;
   wherein the second flow component comprises a component selected from a group consisting of, a filter, a valve, a sensor and combinations thereof;
   wherein the second flow component comprises a fluid filter; and
   further comprising a third flow component positioned in the fluid stick between the first flow component and the mounting surface and in fluid connection with at least one of the first and second flow components.

2. The fluid stock of claim 1, further comprising:
   a block disposed between at least one of the first and second flow components and the mounting surface; and
   a flow path positioned within the block.

3. The fluid stick of claim 2, further comprising a plurality of interconnecting blocks.

4. The fluid stick of claim 2, wherein the block supports the first flow component and is fluidly connected to the second flow component.

5. The fluid stick of claim 1, wherein the mounting surface comprises a portion of a gas box.

6. The fluid stick of claim 1, wherein an outlet of the second flow component is fluidly connected to an inlet of the first flow component.

7. The fluid stick of claim 1, wherein an inlet of the second flow component is fluidly connected to an outlet of the first flow component.

8. The fluid stick of claim 1, wherein the second flow component is more reliable than the first flow component.

9. The fluid stick of claim 1, wherein the third flow component comprises a pressure transducer.

10. The fluid stick of claim 9, wherein the first flow component comprises a mass flow controller.

11. A fluid stick adapted to be mounted to a mounting surface, the fluid stick comprising:
- a mass flow controller positioned in the fluid stick;
- a fluid filter positioned in the fluid stick between the mass flow controller and the mounting surface and in fluid connection with the mass flow controller; and
- at least one of a pressure transducer, a moisture sensor, and a temperature sensor positioned between the mass flow controller and the mounting surface and in fluid connection with at least one of the mass flow controller and the fluid filter.

12. A fluid stick, comprising:
- an inlet;
- an outlet; and
- a plurality of flow components generally arranged along a first axis between the inlet and the outlet and fluidly connected in series;
- wherein a first and a second flow component of the plurality of flow components are arranged along a second axis generally transverse to the first axis;
- wherein the second flow component comprises a component selected from a group consisting of, a filter, a valve, a sensor and combinations thereof;
- wherein the second flow component comprises a fluid filter; and
- wherein a third flow component of the plurality of flow components is generally arranged along the first axis between the inlet and the outlet and fluidly connected to at least one of the first and second flow components.

13. The fluid stick of claim 12, wherein the first and second flow components are in fluid communication.

14. The fluid stick of claim 13, wherein an outlet of the second flow component is fluidly connected to an inlet of the first flow component.

15. The fluid stick of claim 13, wherein an inlet of the second flow component is fluidly connected to an outlet of the first flow component.

16. The fluid stick of claim 12, wherein the second flow component is more reliable than the first flow component.

17. The fluid stick of claim 12, wherein the second flow component comprises the third flow component and the third flow component is integrally constructed with the second flow component.

18. The fluid stick of claim 17, wherein the third flow component is positioned within the second flow component.

19. The fluid stick of claim 12, wherein fluid flow within the second flow component is at least partially in a direction opposite the general flow of fluid in the gas stick.

20. The fluid stick of claim 12, wherein the third flow component comprises a pressure transducer.

21. The fluid stick of claim 20, wherein the first flow component comprises a mass flow controller.

* * * * *